US008230774B1

(12) United States Patent
Hunte (10) Patent No.: US 8,230,774 B1
(45) Date of Patent: Jul. 31, 2012

(54) MULTI-UNIT BOTTLE PREPARATION DEVICE

(76) Inventor: Karen A. Hunte, Hollywood, FL (US)

( * ) Notice: Subject to any disclaimer, the term of this patent is extended or adjusted under 35 U.S.C. 154(b) by 649 days.

(21) Appl. No.: 12/319,800

(22) Filed: Jan. 12, 2009

Related U.S. Application Data (60) Provisional application No. 61/010,678, filed on Jan. 11, 2008.

(51) Int. Cl.
 *A47J 31/00* (2006.01)
 *A23L 1/00* (2006.01)
(52) U.S. Cl. ............... 99/289 R; 99/323.3; 222/129.4; 222/144.5; 222/146.5; 426/433
(58) Field of Classification Search ............ 99/289 R, 99/323.3; 222/144.5, 129.1, 146.5, 129.4, 222/12, 129; 141/82, 91, 100; 426/433
See application file for complete search history.

(56) References Cited

U.S. PATENT DOCUMENTS

| | | |
|---|---|---|
| D365,246 S | 12/1995 | Staffin et al. |
| 5,570,816 A | 11/1996 | LaBarbera, Jr. |
| 5,970,847 A | 10/1999 | Saltzman |
| 6,170,386 B1 | 1/2001 | Paul |
| 6,173,117 B1 * | 1/2001 | Clubb ........................ 392/442 |
| 6,412,527 B1 | 7/2002 | Brice |
| 6,711,990 B1 | 3/2004 | Harrison |
| 6,829,431 B1 | 12/2004 | Haven et al. |
| 6,951,166 B1 | 10/2005 | Sickels |
| 2004/0261625 A1 * | 12/2004 | Fowlkes ........................ 99/331 |
| 2006/0150821 A1 * | 7/2006 | Paul et al. ...................... 99/279 |
| 2006/0278093 A1 * | 12/2006 | Biderman et al. .............. 99/282 |
| 2010/0112180 A1 * | 5/2010 | Laniado ........................ 426/590 |

* cited by examiner

*Primary Examiner* — Reginald L Alexander
(74) *Attorney, Agent, or Firm* — Montgomery Patent & Design, LLC; Robert C. Montgomery; Joseph T. Yaksich (57) ABSTRACT

An all-in-one home appliance that performs the preparation, mixing and heating of multiple infant bottles, is herein disclosed. The apparatus comprises a countertop appliance with three (3) reservoirs comprising water, formula, and cereal, respectively. Inside the base of the appliance is a turnstile that holds up to five (5) empty bottles that have been previously sterilized by the user. In operation, the user would select the bottle size and the necessary recipe of water, formula, and cereal, respectively, using an integral control panel. At this point, internal control circuitry dispenses pre-heated water and dry ingredients in proper ratios into a mixing chamber. After mixing of the ingredients, the mixture is delivered into the proper sized bottle. Finally, internal heaters maintain the bottles at a constant selected temperature. An automatic alarm is then sounded when the prepared bottles are ready. This apparatus ensures preparation of baby bottles having consistent ingredients, mixing, and heating.

19 Claims, 6 Drawing Sheets

MULTI-UNIT BOTTLE PREPARATION DEVICE

RELATED APPLICATIONS

The present invention was first described in U.S. Provisional Patent Application No. 61/010,678 filed on Jan. 11, 2008, the entire disclosures of which are incorporated herein by reference.

FIELD OF THE INVENTION

The present invention relates generally to a user-programmable means and method for pre-mixing and pre-heating a plurality of infant feeding bottles comprising a user-programmable infant solution recipe therewith an apparatus that provides a means and method for loading, positioning, metering, mixing, heating, and dispensing the infant solution thereto a selected infant bottle.

BACKGROUND OF THE INVENTION

Small children receive most of their fluid intake and nutrients through a bottle. Caregivers must quickly prepare and heat formula, cereal or other liquids for the bottle. Temperature of the preparation is extremely important as one does not want a bottle that is too hot for a child. When caring for multiple children, the difficulties are magnified. Accordingly, there exists a need for a means by which multiple baby bottles can be completely prepared and heated in an automated manner. The development of the apparatus and method herein described fulfills this need.

The apparatus discloses an all-in-one bottle preparation apparatus that provides a means of preparation, mixing, and heating of multiple infant bottles. The unique apparatus is a countertop appliance with three (3) reservoirs containing water, formula, and cereal respectively. Inside a base portion of the apparatus is a turnstile that holds up to five (5) empty baby bottles that have been previously sterilized by a user. In operation, the user selects the bottle size and the necessary ratio of water, to formula, to cereal respectively, on an integral control panel. At this point, internal control circuitry dispenses the necessary ingredients in the proper ratio into the proper sized bottle. Next, a stirring device descends into the filled bottle and automatically mixes the ingredients. Finally, an internal heating system heats the bottle to exactly ninety-eight degrees (98°) Fahrenheit. An automatic alarm is sounded when the bottle is ready. This apparatus ensures consistency, precise measurements and exact temperatures at which the contents within the baby bottles are meant to be consumed.

Several attempts have been made in the past to provide a home appliance which provides for the preparation of baby formula. U.S. Pat. No. 5,970,847, issued in the name of Saltzman, describes a baby formula preparation system comprising a blending device having a blade assembly which agitates fluid within said blender as said fluid is pumped in via a pump assembly. However, unlike the present apparatus, the Saltzman system is simply a single type of formula mixture in a blending container for transfer into a baby bottle.

U.S. Pat. No. 6,829,431, issued in the name of Haven et al., discloses a device to automatically prepare infant formula comprising a means of automatically dispensing an amount of dry baby formula and then an amount of heated water to make liquid baby formula. However, unlike the present apparatus, the Haven device only prepares a single bottle at a given time and additionally requires the end user to mix the combined ingredients after combination before serving.

U.S. Pat. No. 6,711,990, issued in the name of Harrison, discloses a baby formula preparation and multiple dispensing apparatus comprising a housing which supports multiple baby bottles which are filled with an amount of dry formula and hot water. However, unlike the present apparatus, the Harrison apparatus lacks a means of mixing a variety of different types of baby food.

Other known prior art baby formula preparation devices includes U.S. Pat. Nos. 5,570,816, 6,412,527, and 6,951,166.

Additionally, ornamental designs for baby formula mixers are provided, particularly, U.S. Pat. No. D 365,246. However, none of these designs are similar to the present apparatus.

While these devices fulfill their respective, particular objectives and appear to disclose various attempts to prepare, filter, and or store baby formula; none of the prior art particularly discloses a countertop apparatus comprising a means of automatically preparing, mixing, and heating of multiple baby bottles. Accordingly, there exists a need for a multi-unit bottle preparation apparatus that operates without the disadvantages as described above.

SUMMARY OF THE INVENTION

In view of the foregoing disadvantages inherent in the prior art, it has been observed that there is need for a multi-unit bottle preparation apparatus having the general purpose of providing for the preparation, mixing, and heating of multiple baby bottles which has many of the advantages of the baby formula devices mentioned and many novel features that result in a new bottle preparation apparatus.

To achieve the above objectives, it is an objective of the present apparatus to provide an enclosure, a first dry ingredient canister, a second dry ingredient canister, a liquid ingredient canister, a control panel, a turntable, a plurality of bottle holders, a means of supplying the ingredients, a means of mixing said supplied ingredients, and a powering means.

A further object of the present apparatus is to provide an enclosure comprising a top portion, a bottom portion, and a hinged door which provides a means of housing the plurality of bottles for preparation, the ingredient canisters, and all internal electrical and mechanical components of the apparatus.

Yet still another object of the present apparatus is to provide a plurality of ingredient canisters which store an amount of various, desired dry and liquid ingredients for mixing to create the baby food mixture.

Yet another object of the present apparatus is to provide a first hopper and a second hopper which provide a means of feeding an amount of dry ingredient into an auger housing.

Yet another object of the present apparatus is to provide an auger housing which comprises a first auger and a second auger which provide a means of delivering the amount of dry ingredient into a mixture chamber.

Yet another object of the present apparatus is to provide a liquid reservoir which provides a means of regulating the volume and temperature of an amount of liquid ingredient which is mixed with the amount of dry ingredient in the mixing chamber.

Yet another object of the present apparatus is to provide a mixing chamber which provides a means of storing the amounts of dry and liquid ingredients while said ingredients are mixed by an impeller.

Yet another object of the present apparatus is to provide an outlet orifice, a mixture release valve, and a dispensing tube which provide a means of dispensing an amount of mixed liquid and dry ingredient combination into a baby bottle.

Yet another object of the present apparatus is to provide a turntable comprising a plurality of bottle holders, a drive assembly, a turn table motor, and a mounting base which provides a means of securing multiple baby bottles and rotating said bottles into an appropriate position under the dispensing means for filling with the amount of mixed ingredients.

Yet another object of the present apparatus is to provide a second heater which provides a means of maintaining a desired temperature of the multiple bottles while said bottles remain secured within the bottle holders.

Yet another object of the present apparatus is to provide a method for utilizing a multi-unit bottle preparation apparatus.

Further objects and advantages of the present apparatus will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 multi-unit bottle preparation device
20 enclosure
21 door
22 latching handle
23 hinge
24 top portion
26 bottom portion
28 skirt
29 first dry ingredient canister
30 second dry ingredient canister
31 liquid canister
32 lid
33 liquid conduit
40 control panel
42 control module
44 housing
46 keypad
48 display
50 alarm
52 power cord
54 wiring
59 first hopper
60 second hopper
61 auger housing
62 first auger
64 second auger
66 first auger motor
68 second auger motor
70 mixing chamber inlet
72 mixing chamber
74 impeller
76 impeller motor
80 liquid reservoir
86 first heater
87 liquid level switch
88 thermocouple
90 liquid nozzle
92 liquid supply solenoid
100 outlet orifice
102 mixture release valve
104 mixture release valve solenoid
106 dispense tube
108 sleeve
110 turntable
111 first bottle holder
112 second bottle holder
113 third bottle holder
114 fourth bottle holder
115 fifth bottle holder
120 drive assembly
122 turntable motor
124 motor shaft
126 flange
128 mounting base
130 fastener
135 second heater
137 second heater mounting flange
138 bracket
140 first dry ingredient
145 second dry ingredient
150 bottle
155 liquid
160 mixture

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a multi-unit bottle preparation device (herein described as the "apparatus") 10, which provides a home appliance which provides the preparation, mixing, and heating of multiple bottles 150. The apparatus 10 comprises a countertop appliance comprising three (3) ingredient canisters 30 of which one (1) comprises a liquid 155, one (1) comprises a first dry ingredient 140, and one (1) comprises a second dry ingredient 145. Said first dry ingredient 140 and second dry ingredient 145 preferably comprises powdered formula and cereal. Inside the enclosure 20 of the apparatus 10 is a turntable 110 which holds and rotates a maximum five (5) empty bottles 150 in an automatic manner. In operation, a user would enter recipe data such as a bottle volume, a turntable position, and a selected dry ingredient 140, 145 using a keypad 46. At this point an internal control module 42 automatically dispenses a pre-heated liquid 155, mixes in the selected dry ingredient 140, 145 dispenses the mixture into the bottle 150, and maintains the filled bottles 150 at approximately ninety-eight degrees (98°) Fahrenheit. Additionally, the apparatus 10 provides an audible alarm 50 which signals an operator when one (1) or more bottles 150 are ready. This apparatus 10 ensures that the bottles 150 are prepared with consistency, precise proportions, and at an exact temperature.

Figure 1:
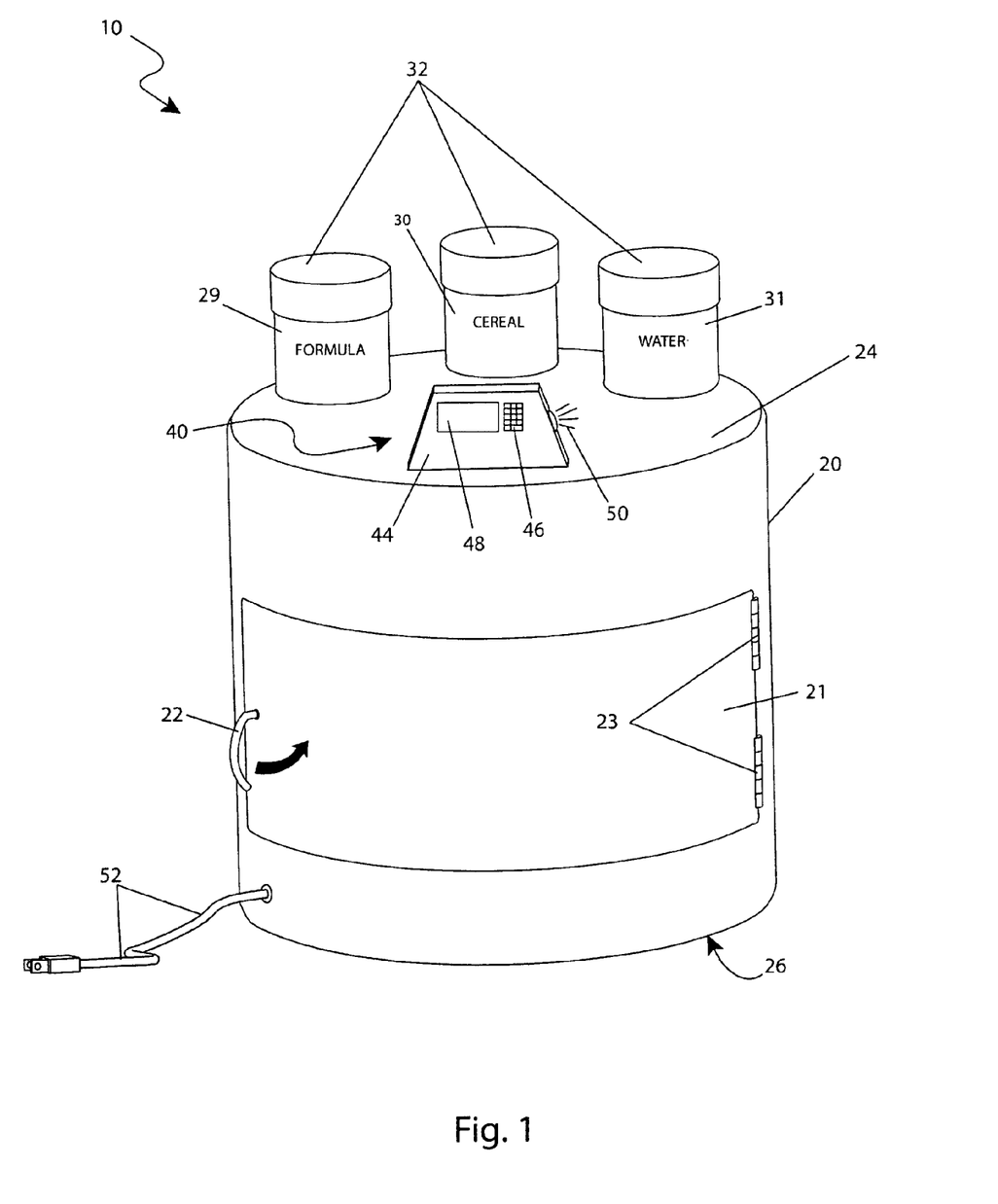
FIG. 1 is a front view of a multi-unit bottle preparation device 10, according to a preferred embodiment of the present invention.

Referring now to FIG. 1, a front view of the apparatus 10, according to the preferred embodiment of the present invention, is disclosed. The apparatus 10 comprises an enclosure 20, a first dry ingredient canister 29, a second dry ingredient canister 30, a liquid canister 31, and a control panel 40. The enclosure 20 comprises a cylindrical-shaped housing approximately eighteen (18) inches in diameter and approximately sixteen (16) inches high. The enclosure 20 is envisioned to be made using durable washable materials such as high-temperature plastic, stainless steel, or the like. The enclosure 20 further comprises a door 21, a latching handle 22, a pair of common vertical axle hinges 23, a top portion 24, and a bottom portion 26. The door 21, latching handle 22, and hinge portions 23 provide controlled access thereinto an interior portion of said enclosure 20 through a large front opening via the horizontally outward swinging door 21. The quarter-turn latching handle 22 provides secure closure of said door 21 during bottle 150 processing. The enclosure 20 further comprises a horizontal top portion 24 which provides an anchoring means thereto the canisters 29, 30, 31 and the control panel 40 along a top horizontal surface.

The canisters 29, 30, 31 comprise cylindrical vessels approximately six (6) to ten (10) inches high having a volume of approximately forty (40) ounces each, being permanently mounted thereto a top portion 24 of the enclosure 20 using conventional metal joining methods such as soldering, welding, fasteners, or the like. The dry ingredient canisters 29, 30 comprise refillable dry ingredients 140, 145 such as powdered baby formula and baby cereal; however, a variety of other ingredients such as drink mix, nutritional supplements, and the like, may be used and as such should not be considered a limiting factor of the invention 10. The canisters 29, 30, 31 further comprise common cylindrical lids 32 providing a conventional top closure means. The canisters 29, 30, 31 and lids 32 are envisioned to be made of dishwasher safe materials such as plastic or stainless steel, common in the industry.

The control panel 40 provides a variety of computer type functions via various electronic input and output devices. The control panel 40 further comprises a keypad 46, a digital display 48, and an audible alarm 50, thereby enabling functions such as, but not limited to: operational software storage, recipe/process memory, recipe selection, process execution, status indicators, and the like. The keypad 46 provides a manual data input means to the control panel 40 and is envisioned to provide a variety of functional keys such as, but not limited to: an "ON" key, a "START" key, an "OFF" key, and the like. The keypad 46 is envisioned to be similar thereto typical computer numeric keypads; however, may be provided with alphanumeric capabilities, special keys, and the like, and as such should not be considered a limiting factor of the invention 10. The display 48 comprises a multi-line display screen capable of displaying all bottle processing input and output information and is envisioned to be a liquid crystal display (LCD); however, may be provided using other current display technologies. The alarm 50 is to be capable of emitting a variety of audible signals indicating particular events during preparation and processing of the bottles 150. The alarm 50 comprises a common piezo type buzzer or similar commercially available miniature audio device and is envisioned to be located along a vertical side surface of said control panel 40.

Figure 2:
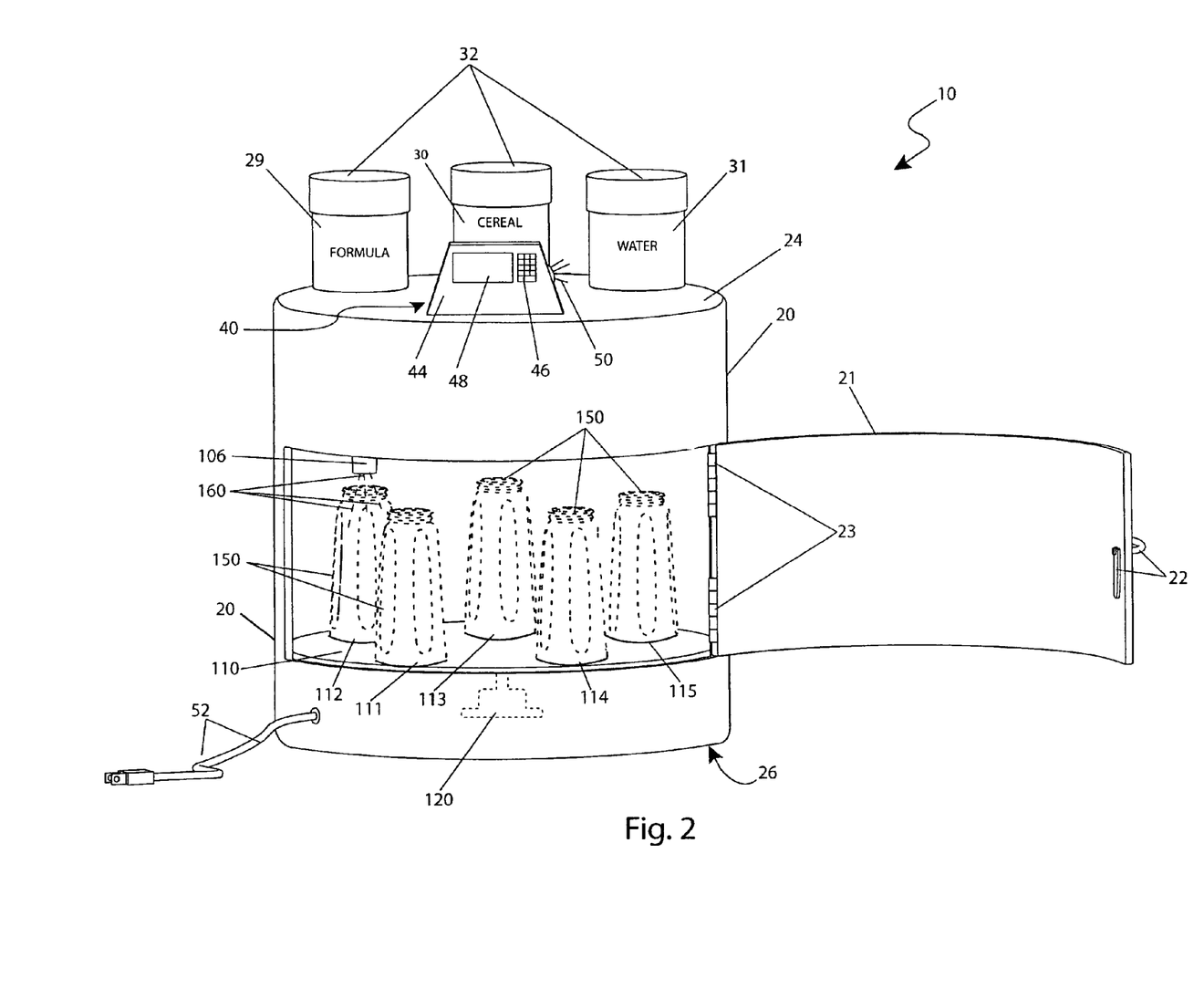
FIG. 2 is an internal front view of a multi-unit bottle preparation device 10 depicting an opened door portion 21, according to a preferred embodiment of the present invention.
Figure 4A:
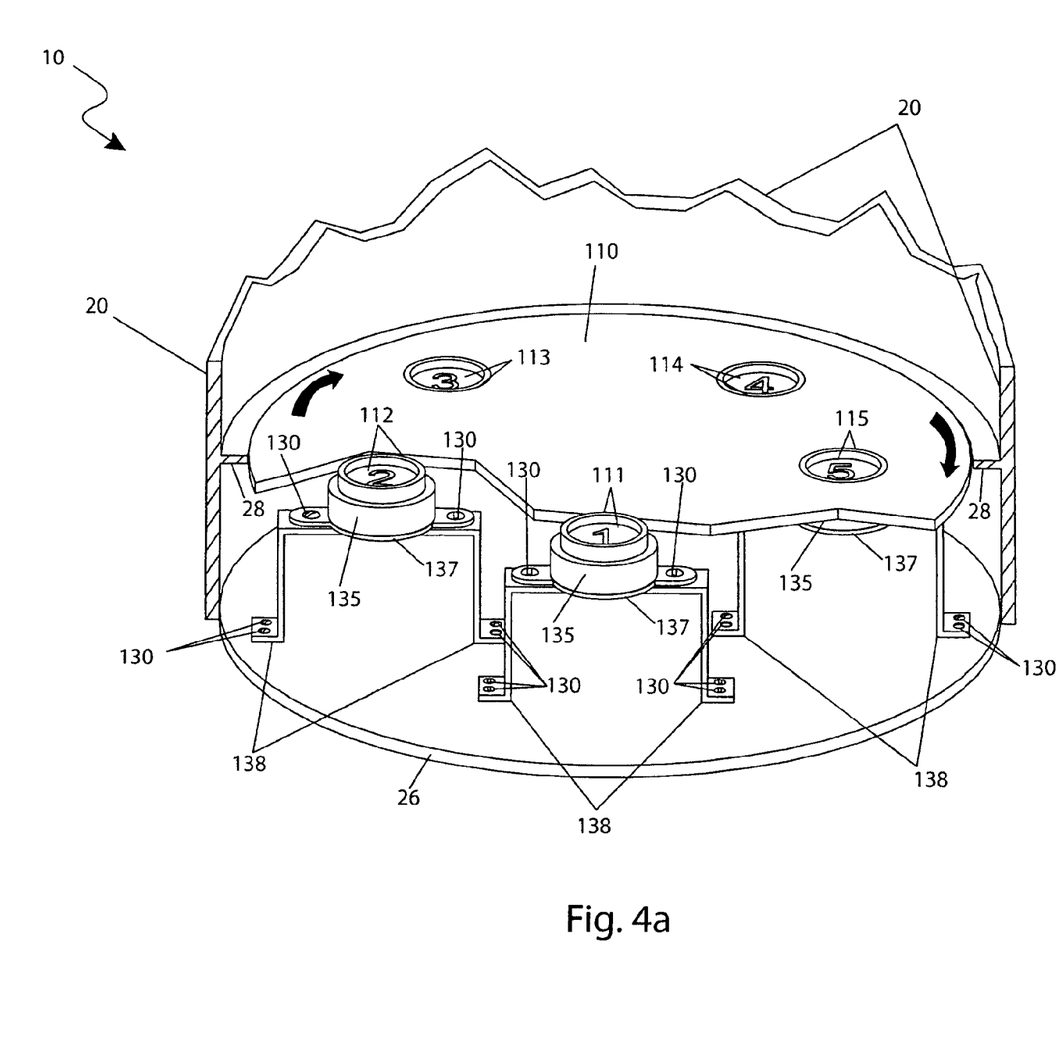
FIG. 4a is an internal view of a multi-unit bottle preparation device 10 depicting a turntable portion 110, according to a preferred embodiment of the present invention.
Figure 4B:
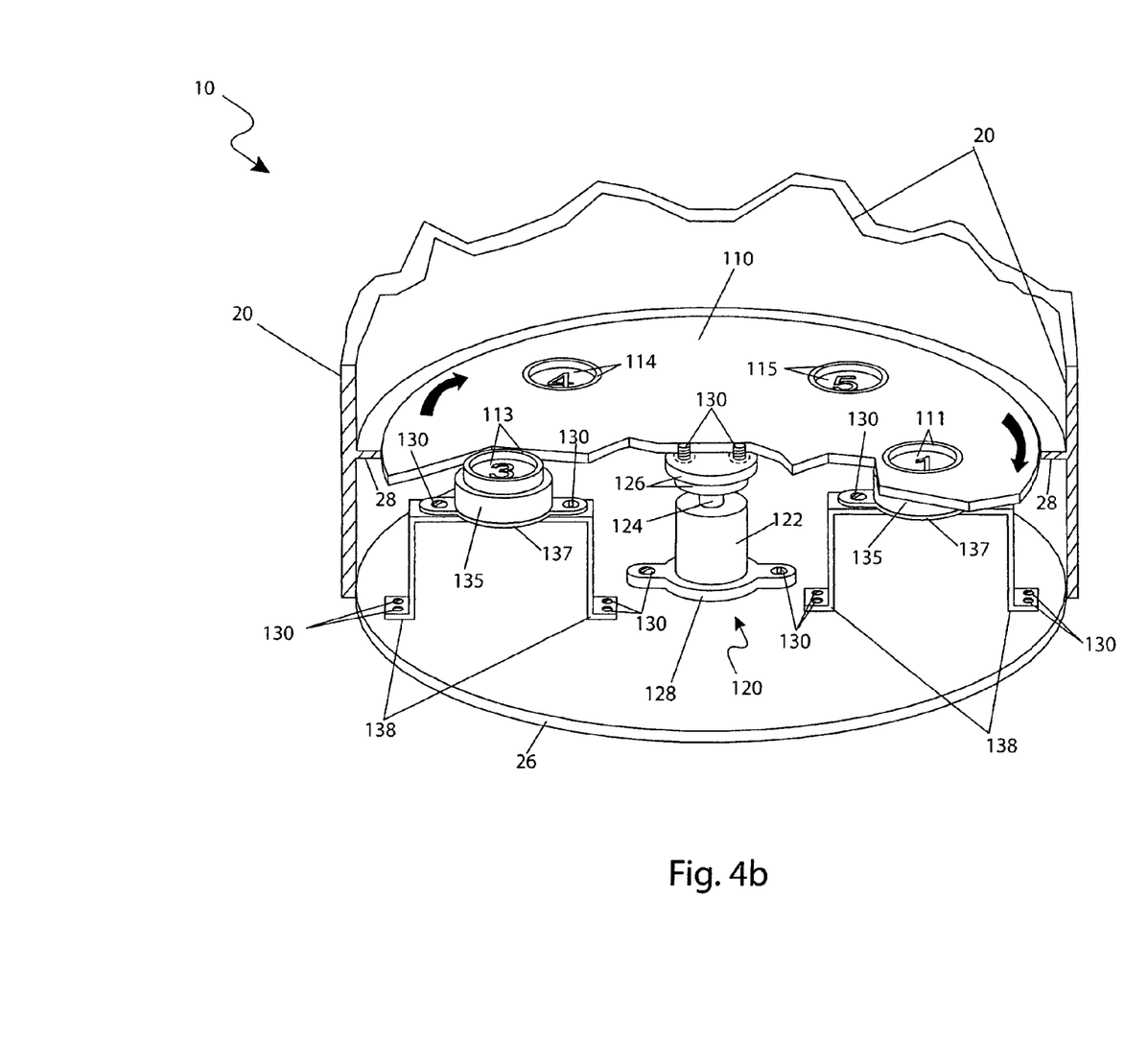
FIG. 4b is an internal view of a multi-unit bottle preparation device 10 depicting a drive assembly 120, according to a preferred embodiment of the present invention; and, FIG. 5 is an electrical block diagram of a multi-unit bottle preparation device 10, according to a preferred embodiment of the present invention.

Referring now to FIG. 2, an internal front view of the apparatus 10, according to the preferred embodiment of the present invention, is disclosed. The apparatus 10 comprises a turntable 110 and a mixture dispense tube 106. The turntable 44 comprises a round rotating horizontal platform located at a bottom internal portion of the enclosure 20. The turntable 110 provides surface features to aid manually loading, accurately positioning, and rotation of one (1) to five (5) bottles 150 during processing. The turntable 110 comprises a first bottle holder 111, a second bottle holder 112, a third bottle holder 113, a fourth bottle holder 114, and a fifth bottle holder 115. The bottle holders 111, 112, 113, 114, 115 provide secure nesting and heating of the bottles 150 (see FIG. 4). The turntable 110 further comprises a motor 122 being located below said turntable 110, thereby rotating said turntable 110 between processing locations (see FIG. 4). The turntable 110 is controlled by the aforementioned control panel 40 via internal software, thereby enabling various sequential dispensing, mixing, and heating processes to be applied to said bottles 150. The stationary dispensing tube 106 delivers a volume of processed mixture 160 as each bottle 150 is sequentially positioned thereunder said dispense tube 106.

Figure 3:
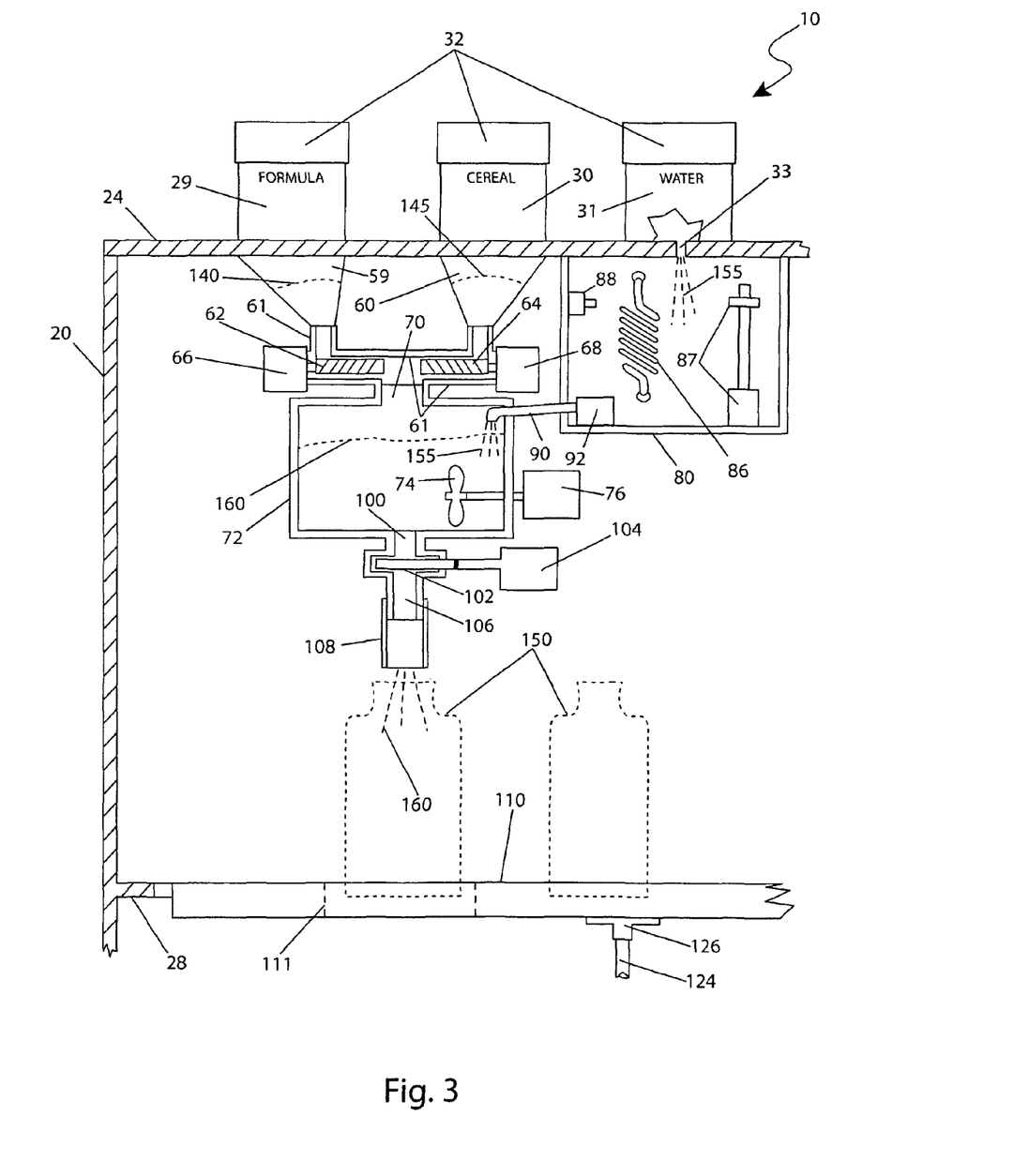
FIG. 3 is an internal view of a multi-unit bottle preparation device 10 depicting an ingredient preparation portion, according to a preferred embodiment of the present invention.

Referring now to FIG. 3, an internal view of the apparatus 10 depicting an ingredient preparation portion, according to a preferred embodiment of the present invention, is disclosed. The apparatus 10 comprises a first hopper 59, a second hopper 60, an auger housing 61, a first auger 62, a second auger 64, a first auger motor 66, a second auger motor 68, a mixing reservoir inlet 70, a mixing reservoir 72, an impeller 74, an impeller motor 76, a liquid reservoir 80, a reservoir outlet 100, a mixture valve 102, and a mixture release valve solenoid 104. Each of the dry ingredient canisters 29, 30 provide a gravity feed means into the auger housing 61 via respective downwardly tapering hoppers 59, 60.

The first dry ingredient canister 29 and second dry ingredient canister 30 provides pre-loaded dry ingredients 140, 145 thereto the apparatus 10. Said dry ingredients 140, 145 progress downwardly therefrom said canisters 29, 30 via gravity feeding, thereinto respective subjacent circular tapering hoppers 59, 60 which guide the dry ingredients 140, 145 thereinto the auger housing 61. Subsequent delivery of said dry ingredients 140 thereto the mixing chamber 72 is accomplished via respective augers 62, 64 which rotate therewithin said auger housing 61. The auger housing 61 comprises a cast or machined metal enclosure means further comprising internal bored features being appropriately sized to slidingly receive said augers 62, 64. The augers 62, 64 comprise cylinder-shaped members having screw threads along external surfaces, thereby providing horizontal motivation and accurate volumetric metering of said dry ingredients 140, 145 thereto a centrally-located mixing chamber inlet 70. Said augers 62, 64 are capable of delivering any combination of dry ingredients 140, 145 in an accurate manner as prescribed by particular recipes stored therein a memory portion of the control panel 40. Furthermore, said auger housing 61 provides an attachment means thereto respective auger motors 66, 68 along opposing outer surfaces. The auger motors 66, 68 are in mechanical communication therewith the augers 62, 64 and provide a sufficient torque thereto so as to progress said dry ingredients 140, 145 thereto the mixing chamber inlet 70 during operation. The mixing chamber inlet 70 provides a vertical orifice means allowing said dry ingredients 140, 145 to progress thereinto the mixing chamber 72.

The liquid canister 31 provides a volume of liquid 155 thereto the apparatus 10 for mixing. As the liquid 155 is added thereto said liquid canister 31, said liquid 155 progresses thereto a subjacent liquid conduit 33 which provides a plumbing or conduit means therebetween the liquid canister 31 and a subjacent cylindrical-shaped liquid reservoir 80. The liquid reservoir 80 comprises a vessel capable of heating said liquid 155 and maintaining a consistent temperature thereof. The liquid reservoir 80 comprises a first heater 86, a liquid level switch 87, a thermocouple 88, a liquid nozzle 90, and a liquid supply solenoid 92. Said liquid 155 is heated and maintained at an operator selected temperature, envisioned to be approximately ninety-eight degrees (98°) Fahrenheit. The liquid 155 is heated therewithin the liquid reservoir 80 using a common resistance-type heating element similar thereto units used in conventional hot liquid heaters and is controlled using a standard thermocouple 88 which provides temperature data thereto the control panel 40 resulting in intermittent cycling of said first heater 86, thereby maintaining a consistent liquid temperature. The liquid level switch 87 comprises a magnetic float-type switch providing a low liquid level signal thereto the control panel 40. If a liquid level 155 therewithin said liquid reservoir 80 becomes low, the liquid level switch 87 provides a warning/alarm signal thereto an operator via the control panel 40 (see FIG. 5). During processing and filling of said bottles 150, said pre-heated liquid 155 flows therethrough a liquid nozzle 90 allowing a flow of liquid 155 to enter directly thereinto the mixing chamber 72. Accurate volumetric control of said liquid flow 155 therefrom the liquid reservoir 80 thereinto the liquid nozzle 90 is provided via a liquid supply solenoid valve 92 being controlled by operational software therewithin the control panel 40.

Upon receipt of metered dry ingredients 140, 145 and the liquid 155 thereinto the mixing chamber 72, subsequent timed mixing of said ingredients thereinto a finished mixture 160 is accomplished via an internal motorized bladed impeller 74 capable of variable speed control via the software portion of the apparatus 10. Following said mixing process, the mixture 160 is released vertically downward therefrom the mixing chamber 72 and into a positioned bottle 150 via a mixing chamber outlet orifice 100, a mixture release valve 102, a mixture release valve solenoid 104, a dispense tube 106, and a dispense tube sleeve 108. The mixture release valve 102 comprises a common two-position electrical solenoid operated sluice valve 102. After release of the mixture 160 via the mixture release valve 102, said mixture 160 is conveyed downwardly thereinto the bottle 150 via the dispense tube 106 which provides a plumbing conduit means having an external sliding dispense tube sleeve 108 providing a length adjustable means, thereby allowing manual compensation for bottles 150 having different heights.

Referring now to FIGS. 4a and 4b, internal views of the apparatus 10 depicting turntable 110 and motor 122 portions, respectively, according to a preferred embodiment of the present invention, are disclosed. The turntable 110 is mounted thereto a bottom portion 26 of the enclosure 20 which comprises a floor-like member thereto. The enclosure 20 further comprises an integral circular skirt member 28 which protrudes horizontally therefrom an inner surface thereof being coincidental therewith a top surface of the turntable 110 along a perimeter region of said turntable 110, thereby providing a safety and aesthetic surrounding barrier as illustrated here. The turntable 110 further comprises a first bottle holder 111, a second bottle holder 112, a third bottle holder 113, a fourth bottle holder 114, and a fifth bottle holder 115. The bottle holders 111, 112, 113, 114, 115 comprise equally-spaced cylindrical insert portions being made using a thermally conductive material such as aluminum, ceramic compounds, or the like. Said bottle holders 111, 112, 113, 114, 115 are affixed and mounted thereto said turntable 110 via a press fit and/or high temperature adhesives. Each bottle holder 111, 112, 113, 114, 115 comprises a central recessed circular area comprising a corresponding diameter to that of the bottles 150 and engraved or printed therewith a respective turntable position number to aid in programming individual bottle recipes. Said bottle holders 111, 112, 113, 114, 115 are to be flush therewith a top surface of said turntable 110 and are designed to captivate and control a position of an included bottle 150. Each bottle holder 111, 112, 113, 114, 115 further comprises a bottom surface which extends slightly therebelow a bottom surface of the turntable 110. The bottom surface portions of the bottle holders 111, 112, 113, 114, 115 provide incidental contact therewith three (3) successive subjacent second heaters 135 arranged along a front portion of the enclosure 20 adjacent therewith the door portion 21. Said contact therebetween said bottle holders 111, 112, 113, 114, 115 and first heaters 135, provides an efficient heat conduction means thereto the bottle 150. The second heaters 135 comprise round cartridge-type heaters being cylindrical in shape and having similar diameters as the bottle holders 111, 112, 113, 114, 115. Each second heater 135 is securely mounted thereto the bottom portion 26 of the enclosure 20 via a second heater mounting flange 137 and a "U"-shaped sheetmetal bracket 138 using a plurality of common fasteners such as screws, rivets, or the like. Each second heater 135 is positioned along said bottom portion 26 so as to coincide therealong a vertical axis therewith a corresponding bottle holder 111, 112, 113, 114, 115 when said bottle holder 111, 112, 113, 114, 115 is at rest during each processing step of the apparatus 10.

Figure 5:
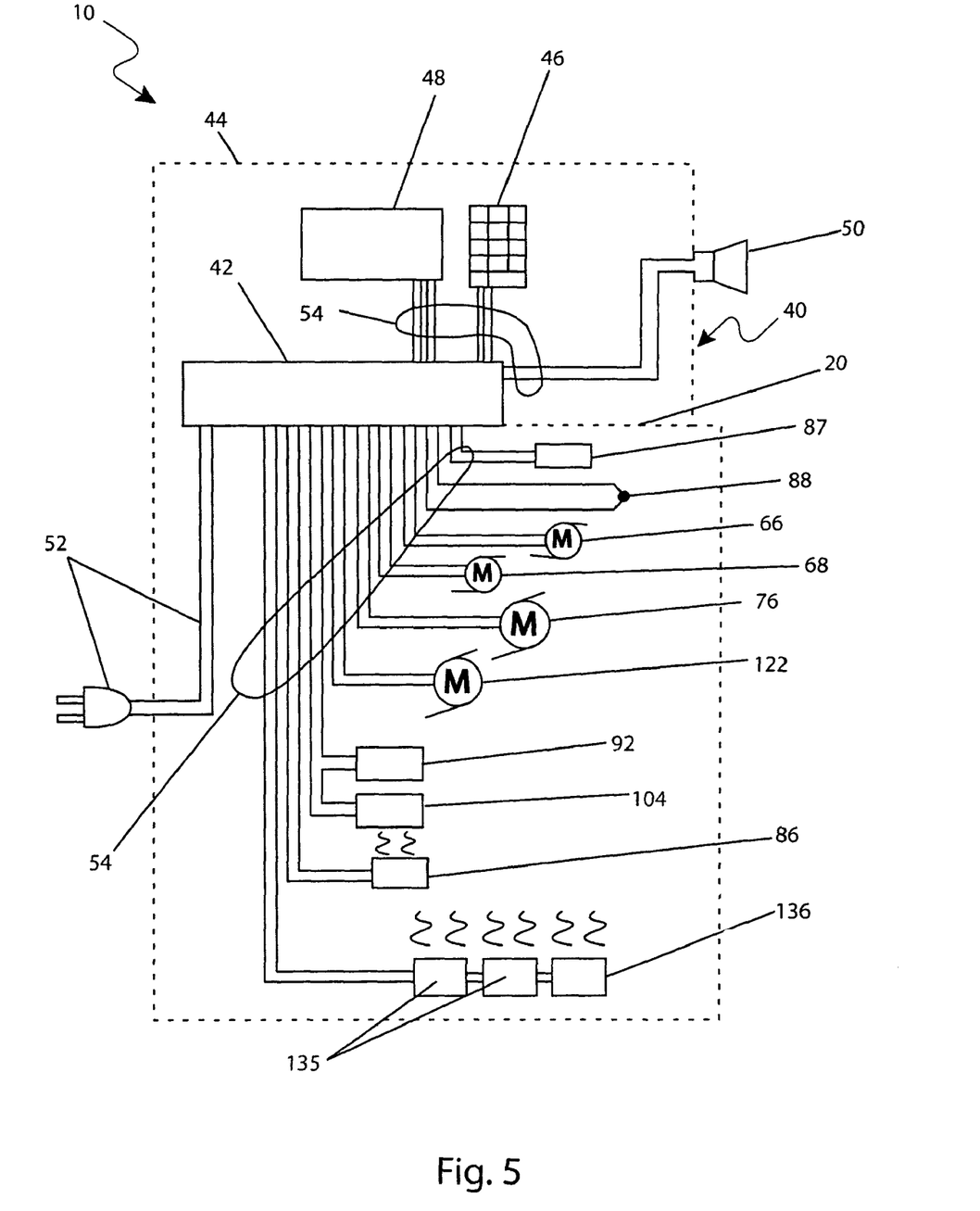

The turntable 110 provides a rotating means via a bottom-mounted motor 122, thereby smoothly rotating said turntable 110 therebetween each processing location as controlled thereby the aforementioned control panel 40 via internal software (see FIG. 5). The motor 122 provides a sufficient clockwise torque thereto said turntable 110 so as to rotate said turntable 110 therewith a maximum of five (5) bottles 150, with sufficient velocity so as to minimize bottle 150 preparation times. The motor 122 comprises a commercially available vertically-mounted unit affixed thereto the bottom interior portion 26 of the enclosure 20 via a standard mounting base 128 using common fasteners 130. The motor 122 comprises a vertical output shaft 124 which protrudes in an upward direction being in mechanical communication therewith said turntable 110 in a perpendicular manner via a common shaft-mounted circular flange 126 affixed thereto a bottom surface of said turntable 110 via common fasteners 130.

Referring now to FIG. 5, an electrical block diagram of the apparatus 10, according to the preferred embodiment of the present invention, is disclosed. Illustrated herein is a control panel 40 comprising a display 48, a keypad 46, and a 110-volt AC power cord 52. The control panel 40 provides various control capabilities thereto the apparatus 10 such as, but not limited to: programmable sequential processing steps, recipe/ process data memory, recipe and parameter selection, process execution, status/information display, a hot water cleansing sequence, and the like. The control panel 40 comprises an internal control module 42 providing microprocessor-based functionality thereto the apparatus 10. The control module 42 comprises a standard plastic housed enclosure containing expected electrical and electronic components such as, but not limited to: internal printed circuit boards, power supplies, relays, electronic components, and the like. Power is supplied thereto said control module 42 via a standard 110-volt power cord 52. Additionally, there are various input/output circuits connected thereto the control module 42 via internal wiring 54. Input circuits wired 54 thereto the control module 42 comprise the keypad 46, the liquid level switch 87, and the thermocouple 88. Output current circuits wired 54 thereto said control module 42 comprise the display 48, the first auger motor 66, the second auger motor 68, the impeller motor 76, the turntable motor 122, the liquid supply solenoid 92, the mixture release valve solenoid 104, the first heater 86, and the second heaters 135 shown here being wired in a parallel manner.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2.

The method of installing and utilizing the apparatus 10 may be achieved by performing the following steps: placing the apparatus 10 upon a table or counter surface in a convenient location; plugging the apparatus 10 into a convenient 110-volt AC outlet via a power cord 52; removing the lids 32 therefrom the canisters 29, 30, 31; filling the first dry ingredient canister 29 therewith a first dry ingredient 140; filling the second dry ingredient canister 30 therewith a second dry ingredient 145; filling the liquid canister 31 with a desired liquid 155; replacing said lids 32 thereupon said canisters 29, 30, 31; starting the apparatus 10 by pressing an "ON" function button thereupon the keypad 46 portion of the control panel 40 to power and activate the apparatus 10; programming the control panel 40 using the display 48 and keypad 46, with various recipe and processing data information; opening the door 21 and loading a desired number of bottles 150 onto the numbered bottle holder portions 111, 112, 113, 114, 115 of the turntable 110; coordinating entered recipe and processing information data therewith particular bottle holder locations by giving care as to the specific number therewithin the bottle holder 111, 112, 113, 114, 115; closing the door 21 and securing using the latching handle 22; pressing a "START" function button portion thereon the keypad 46 to initiate a bottle 150 preparation process; monitoring dispensing, mixing, and heating process steps as information appears on the display 48; responding thereto an audible alarm signal 50 upon availability of one (1) or more fully processed bottles 150; opening the door 21 using the latching handle 22 and unloading one (1) or more bottles 150; serving the bottle 150 and contained mixture 160 thereto a user; repeating the bottle 150 preparation process until a required number of bottles 150 have been provided; initiating a flushing/cleansing sequence using the keypad 46 and integral software; pressing an "OFF" function button thereupon the keypad 46 to deactivate the apparatus 10; and, benefiting from significant time savings and high quality preparation of formula and cereal recipes using the present invention 10.

The method of installing and utilizing the apparatus 10, wherein the various recipe processing data information includes items such as, but not limited to: bottle size 150, recipe selection, liquid temperature, second heater 135 temperature, and the like, is entered using the display 48 and keypad 46.

The method of installing and utilizing the apparatus 10, wherein the first dry ingredient 140, is provided as powder baby formula, the second dry ingredient 145, is provided as baby cereal, and the liquid 155 is water.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A multi-unit bottle preparation apparatus comprising:
    an enclosure, further comprising:
        an interior portion, an upper portion, and a lower portion;
        a turntable rotatably attached thereto a bottom portion of said interior portion, comprising a support means therefor a plurality of bottles; and,
        a rotating means for rotating said turntable attached thereto a bottom portion thereof said interior portion;
        a dispensing means integral therewith said enclosure for dispensing contents therein a selected bottle thereof said plurality of bottles;
        a first canister, a second canister, and a third canister each attached thereto an upper portion thereof said enclosure and including a lid and each in fluid communication therewith said dispensing means;
        a control means for providing a processing means therefor said apparatus, comprising a control panel mounted thereto said enclosure;
        a door hingedly attached to a front vertical surface at a first end and further comprising a latching handle; and,
        a skirt member protruding horizontally from an inner surface of said enclosure being coincidental with a top surface along a perimeter region of said turntable;
        wherein said door provides a controlled access into said interior portion;
        wherein said latching handle provides a secure closure of said door; and,
        wherein said skirt member provides a safety and aesthetic surrounding barrier for said turntable;
    wherein each said first canister, said second canister, and said third canister are refillable with said contents;
    wherein said apparatus provides a preparation means, a mixing means, and a heating means;
    wherein said apparatus provides a temperature control means; and,
    wherein said processing means is entered thereby a user.

2. The apparatus of claim 1, wherein said enclosure further comprises a cylindrical-shaped housing.

3. The apparatus of claim 2, wherein said enclosure is approximately eighteen (18) inches in diameter and approximately sixteen (16) inches in height.

4. The apparatus of claim 1, wherein said turntable comprises a round rotating horizontal platform providing loading, positioning, and rotating of said plurality of bottles during said processing means, further comprising:
- a plurality of bottle holders for supporting each of said plurality of bottles affixed and equidistantly-spaced thereon said turntable
- an attachment means thereto said rotating means;
- wherein said turntable is selectively controlled thereby said control means to position said selected bottle thereto a processing position via said rotating means.

5. The apparatus of claim 4, wherein said plurality of bottle holders each further comprise:
- a cylindrical insert portion comprising a thermally conductive material;
- a central recessed area comprising a diameter thereby allowing each of said plurality of bottles to reside therein;
- a turntable position number located thereon said central recessed area; and,
- a bottom surface extending slightly therebelow a bottom surface of said turntable.

6. The apparatus of claim 5, further comprising a plurality of heating devices in electrical communication therewith said control means, each further comprising:
- a cylindrical cartridge-type heater; and,
- a second heater mounting flange securely mounting said heater thereto said bottom portion of said interior enclosure therewith a bracket;
- wherein said bottom surface thereof each of said plurality of bottle holders incidentally contacts a top surface thereof one (1) of said plurality of heaters; and,
- wherein said plurality of heaters provide a heat conduction means thereto said bottom surface thereof each of said plurality of bottle holders.

7. The apparatus of claim 6, wherein said plurality of heating devices further comprises three (3) successive subjacent heaters arranged along a front portion of said enclosure adjacent therewith said door.

8. The apparatus of claim 4, wherein said rotating means further comprises:
- a motor in electrical communication therewith said control means and mounted thereto a central location thereof said bottom portion thereof said interior portion via a mounting base;
- an output shaft protruding in an upward direction being in mechanical communication therewith said turntable in a perpendicular manner via a shaft-mounted circular flange affixed thereto a bottom surface thereof said turntable;
- wherein said motor provides a sufficient torque thereto said turntable with a maximum load.

9. The apparatus of claim 8, wherein said maximum load further comprises five (5) full bottles.

10. The apparatus of claim 1, wherein said dispensing means further comprise:
- a mixing chamber located within said enclosure, comprising a mixing chamber inlet and a mixing chamber outlet in fluid communication therewith said dispensing means;
- a first delivering means for delivering said contents thereof said first canister thereto and in fluid communication therewith said mixing chamber inlet;
- a second delivering means for delivering said contents thereof said second canister thereto and in fluid communication therewith mixing chamber inlet;
- a third delivering means for delivering said contents thereof said third canister thereto said mixing chamber;
- an impeller for mixing said contents therein said mixing chamber to produce mixed contents;
- an impeller motor in electrical communication therewith said control means for driving said impeller;
- said dispensing means further comprising:
  - a mixture release valve connected thereto and in fluid communication therewith said mixing chamber outlet and in electrical communication therewith said control means; and,
  - a dispense tube connected thereto and in fluid communication therewith said mixture release valve comprising a length-adjustable dispense tube sleeve;
- wherein said first delivering means and said second delivering means comprises a dry ingredient handling means; and,
- wherein said third delivering means comprises a liquid ingredient handling means;
- wherein said dispense tube dispenses said mixed contents thereto a selected bottle as programmed thereby said processing means.

11. The apparatus of claim 10, further comprising:
- an auger housing in fluid communication therewith said first delivering means at a first inlet and said second delivering means at a second inlet, comprising a manifold with a first auger and a second auger;
- a first auger motor driving said first auger and in electrical communication therewith said control means; and,
- a second auger motor driving said second auger and in electrical communication therewith said control means;
- wherein said first delivering means further comprises a first downwardly-tapering hopper thereto said auger housing;
- wherein said second delivering means further comprises a first downwardly-tapering hopper thereto said auger housing;
- wherein said first auger provides an advancing means therefor said contents thereof said first canister as programmed thereby said processing means thereto said mixing chamber inlet; and,
- wherein said second auger provides an advancing means therefor said contents thereof said second canister as programmed thereby said processing means thereto said mixing chamber inlet.

12. The apparatus of claim 11, wherein said third delivering mean further comprises:
- a conduit in fluid communication therewith said third canister;
- a reservoir subjacent thereto said third canister and in fluid communication therewith said conduit;
- a level switch in electrical communication therewith said control means;
- an outlet nozzle conducting said contents therefrom said reservoir thereinto said mixing chamber; and,
- a solenoid valve in electrical communication therewith said control means;
- wherein said solenoid valve provides an advancing means therefor said contents thereof said reservoir as programmed thereby said processing means therethrough said outlet nozzle and thereinto said mixing chamber; and, wherein said level switch provides a low level signal thereto said control means.

13. The apparatus of claim 12, further comprising:
a heater in electrical communication therewith said control means therewithin said reservoir;
a thermocouple in electrical communication therewith said control means therewithin said reservoir;
wherein said heater provides said temperature control means at a constant temperature as programmed thereby said processing means; and,
wherein said thermocouple provides temperature data thereof said contents therein said reservoir thereto said control means to provide intermittent cycling of said first heater, thereby providing said constant temperature.

14. The apparatus of claim 1, wherein each of said first canister, said second canister, and said third canister further comprise a cylindrical vessel with a top closure means.

15. The apparatus of claim 14, wherein said cylindrical vessel is approximately six (6) to ten (10) inches in height and having a capacity of approximately forty (40) ounces.

16. The apparatus of claim 15, wherein said contents comprise:
a first dry ingredient and a second dry ingredient for placement therein said first canister and said second canister respectively; and,
a fluid ingredient for placement therein said third canister.

17. The apparatus of claim 1, wherein said control panel further comprises:
a power supply connection means;
a control module for receiving and executing said processing means therefor said apparatus;
a keypad, providing a manual data input means therefor said processing means;
a digital display for displaying said processing means as inputted therein; and,
an audible alarm for emitting audible signals related thereto said processing means.

18. The apparatus of claim 1, wherein said processing means further comprises programmable sequential processing steps, recipe/process data memory, recipe and parameter selection, process execution, status/information display, a hot water cleansing sequence as selectable inputs thereto said apparatus.

19. A method of processing a plurality of infant bottles therewith a pre-mixed and pre-heated infant solution thereto a selected bottle thereby a programmable processing means inputted thereinto a control means located thereon an apparatus comprises the following steps:
providing an enclosure for pre-mixing and pre-heating said plurality of infant bottles, further comprising:
an interior portion, an upper portion, and a lower portion;
a first canister with a lid attached thereto an upper portion thereof said enclosure comprising a refillable amount of a first dry ingredient;
a second canister with a lid attached thereto an upper portion thereof said enclosure comprising a refillable amount of a second dry ingredient;
a third canister with a lid attached thereto an upper portion thereof said enclosure comprising a refillable amount of a liquid ingredient;
a door hingedly attached thereto a front vertical surface at a first end and further comprising a latching handle;
a skirt member protruding horizontally therefrom an inner surface thereof said enclosure being coincidental therewith a top surface along a perimeter region thereof a turntable;
said turntable rotatably attached thereto a bottom portion of said interior portion, comprising a support means, a loading means, and a positioning means therefor said plurality of infant bottles;
a rotating means attached thereto a bottom portion thereof said interior portion for providing a rotating means thereto and affixed thereto a bottom surface thereof said turntable, comprising a motor in electrical communication therewith said control means and an output shaft protruding in an upward direction being in mechanical communication therewith said turntable in a perpendicular manner via a shaft-mounted circular flange;
a plurality of bottle holders for supporting each of said plurality of bottles affixed and equidistantly-spaced thereon said turntable, further comprising:
a cylindrical insert portion comprising a thermally conductive material;
a central recessed area comprising a diameter thereby allowing each of said plurality of bottles to reside therein and a turntable position number located thereon said central recessed area; and,
a bottom surface extending slightly therebelow a bottom surface of said turntable;
a plurality of heating devices in electrical communication therewith said control means, each further comprising a cylindrical cartridge-type heater and a second heater mounting flange securely mounting said heater thereto said bottom portion of said interior enclosure therewith a bracket;
a mixing chamber located within said enclosure, comprising a mixing chamber inlet and a mixing chamber outlet;
a first delivering means for delivering said first dry ingredient thereof said first canister thereto and in fluid communication therewith said mixing chamber inlet;
a second delivering means for delivering said second dry ingredient thereof said second canister thereto and in fluid communication therewith mixing chamber inlet;
an auger housing in fluid communication therewith said first delivering means at a first inlet and said second delivering means at a second inlet, comprising a manifold with a first auger and a second auger;
a first auger motor driving said first auger and in electrical communication therewith said control means; and,
a second auger motor driving said second auger and in electrical communication therewith said control means
a third delivering means for delivering liquid ingredient thereof said third canister thereto said mixing chamber;
a conduit in fluid communication therewith said third canister;
a reservoir subjacent thereto said third canister and in fluid communication therewith said conduit;
a level switch in electrical communication therewith said control means;
an outlet nozzle conducting said contents therefrom said reservoir thereinto said mixing chamber;
a solenoid valve in electrical communication therewith said control means;

a heater in electrical communication therewith said control means therewithin said reservoir;

a thermocouple in electrical communication therewith said control means therewithin said reservoir an impeller for mixing said first dry ingredient, said second dry ingredient, and said liquid ingredient therein said mixing chamber to produce said pre-mixed and pre-heated infant solution;

an impeller motor in electrical communication therewith said control means for driving said impeller;

a dispensing means further comprising:

a mixture release valve connected thereto and in fluid communication therewith said mixing chamber outlet and in electrical communication therewith said control means; and,     a dispense tube connected thereto and in fluid communication therewith said mixture release valve comprising a length-adjustable dispense tube sleeve; and, said control means for providing a processing means therefor said apparatus, comprising a control panel mounted thereto said enclosure, further comprising a power supply connection means, a control module for receiving and executing said processing means therefor said apparatus, a keypad for providing a manual data input means therefor said processing means, a digital display for displaying said processing means as inputted therein and, an audible alarm for emitting audible signals related thereto said processing means;

placing said apparatus thereupon a fat surface in a convenient location;

supplying power thereto said control panel;

filling said first canister therewith a desired amount thereof said first dry ingredient and placing said lid thereon;

filling said second canister therewith a desired amount thereof second dry ingredient and placing said lid thereon;

filling said third canister therewith a desired amount thereof a liquid and placing said lid thereon;

starting said apparatus by pressing an "ON" function button thereupon said keypad thereof said control panel to power and activate said apparatus;

programming said control module using said digital display and keypad with various recipe and processing data information;

opening said door and loading a desired number of bottles onto said plurality of bottle holder thereof said turntable;

coordinating entered said various recipe and processing information data thereto said selected bottle therein a particular bottle holder location thereby said turntable position number;

closing and securing said door using said latching handle;

rotating said turntable to position said selected bottle thereto a dispensing position;

pressing a "START" function button thereon said keypad to initiate a bottle preparation process, wherein said first auger advances an amount of said first dry ingredient thereto said mixing chamber, said second auger advances an amount of said second dry ingredient said mixing chamber, said heater pre-heats said liquid residing therein said liquid reservoir, said solenoid valve advances an amount of said liquid thereto said mixing chamber, said impeller mixes said first dry ingredient, said second dry ingredient, and said liquid to produce said pre-mixed and pre-heated infant solution, and said mixture release valve dispenses said pre-mixed and pre-heated infant solution thereto said selected bottle;

repeating the above step until a desired number of selected bottles are filled therewith said pre-mixed and pre-heated infant solution;

responding thereto said audible alarm signal upon availability of one (1) or more processed bottles;

opening said door using said latching handle and unloading one (1) or more processed bottles for subsequent usage;

providing an auxiliary heating method therewith positioning said one (1) or more processed bottles thereover said plurality of heating devices;

responding thereto said audible alarm signal upon a low liquid level therein said reservoir thereby said low level switch;

initiating a flushing/cleansing sequence using said keypad; and, pressing an "OFF" function button thereupon said keypad to deactivate said apparatus.

\* \* \* \* \*